United States Patent [19]
Ims

[11] Patent Number: 5,136,305
[45] Date of Patent: Aug. 4, 1992

[54] INK JET PRINTER WITH INK SUPPLY MONITORING MEANS

[75] Inventor: Dale R. Ims, Webster, N.Y.

[73] Assignee: Xerox Corporation, Stamford, Conn.

[21] Appl. No.: 623,154

[22] Filed: Dec. 6, 1990

[51] Int. Cl.$^5$ ............................................. B41J 2/175
[52] U.S. Cl. ................................... 346/1.1; 73/295; 323/315; 323/366; 346/140 R
[58] Field of Search .................. 346/140, 1.1; 340/618-622; 73/290-324; 323/315, 231, 366

[56] References Cited

U.S. PATENT DOCUMENTS

| | | | |
|---|---|---|---|
| 3,114,872 | 12/1963 | Allard | 323/315 |
| 3,967,286 | 6/1976 | Andersson et al. | 346/140 R |
| 4,178,595 | 12/1979 | Jinnai | 346/140 |
| 4,432,005 | 2/1984 | Duffield et al. | 346/140 R |
| 4,550,261 | 10/1985 | Hormel | 73/304 X |
| 4,656,464 | 4/1987 | Cliffgard | 73/295 X |
| 4,677,448 | 6/1987 | Mizusawa et al. | 346/140 R |
| 4,737,801 | 4/1988 | Ichihashi et al. | 346/140 R |
| 4,757,331 | 7/1988 | Mizusawa | 346/140 R |
| 4,788,861 | 12/1988 | Lichti | 73/304 R |
| 4,929,969 | 5/1990 | Morris | 346/140 R |
| 4,973,993 | 11/1990 | Allen | 346/140 |

Primary Examiner—Joseph W. Hartary
Attorney, Agent, or Firm—Robert A. Chittum

[57] ABSTRACT

A carriage type ink printer having a replenishable ink cartridge and ink jet printhead mounted on the carriage for translation across a printing region of an ink jet printer. The replenishable ink cartridge having means to keep the necessary negative pressure at the printhead by way of a foam-like material contains an ink supply monitoring means which uses a thermistor and constant current circuitry to indicate when it should be resupplied with ink. The printer controller moves the replenishable cartridge to a predetermined side of the printer beyond the printing region and into position to receive ink from a fixed ink supply container. The ink supply monitoring means indicating when the replenishable cartridge is filled in order to prevent over filling the cartridge.

5 Claims, 4 Drawing Sheets

INK JET PRINTER WITH INK SUPPLY MONITORING MEANS

BACKGROUND OF THE INVENTION

This invention relates to moving carriage type thermal ink jet printers, and more particularly, to a thermal ink jet printhead and replenishable reservoir which travels therewith having means to sense the ink content thereof so that it may be refilled at predetermined ink content levels.

Thermal ink jet printing systems use thermal energy selectively produced by resistors located in capillary filled ink channels near channel terminating nozzles or orifices to vaporize momentarily the ink and form bubbles on demand. Each temporary bubble expels an ink droplet and propels it toward a recording medium. The printing system may be incorporated in either a carriage type printer or a pagewidth type printer. A carriage type printer generally has a relatively small printhead containing the ink channels and nozzles. The printhead is usually sealingly attached to an ink supply cartridge and the combined printhead and cartridge assembly is reciprocated to print one swath of information at a time on a stationarily held recording medium, such as paper. After the swath is printed, the paper is stepped a distance equal to the height of the printed swath, so that the next printed swath will be contiguous therewith. The procedure is repeated until the entire page is printed. In contrast, the pagewidth printer has a stationary printhead having a length equal to or greater than the width of the paper. The paper is continually moved past the pagewidth printhead in a direction normal to the printhead length at a constant speed during the printing process. Moving carriage type ink jet printers must either carry the ink reservoir along with the printhead or provide a flexible ink supply line between the moving printhead and a stationary ink reservoir. In addition, thermal ink jet devices require a small negative pressure at the printhead in order prevent ink from weeping from their droplet expelling nozzles.

Generally, thermal ink jet printers of the moving carriage type use a relatively large stationary ink reservoir and a flexible supply line arrangement to a movable small ink reservoir that is attached to the moving printhead. This is because the carriage providing the printhead motion is subjected to periodic accelerations at the ends of scan. Therefore, a large carriage mounted ink reservoir would require a large drive motor along with robust structure in order to achieve rapid carriage accelerations and accurate control of the printhead position. Small carriage mounted disposable ink reservoirs suffer the disadvantage of requiring frequent replacement. Such disposable ink reservoirs generally are bundled with the ink jet printhead so that both are discarded when the cartridge is empty.

U.S. Pat. Nos. 3,967,286; 4,677,448; and 4,757,331 disclose a recording apparatus with a carriage mounted ink tank and a second tank that is fixed. The second tank remains disconnected from the first tank during recording and intermittently is connected to the first carriage mounted tank when the ink is to be supplied from the second tank to the first.

U.S. Pat. No. 4,737,801 discloses an ink supply device comprising a first ink tank and a second ink tank for supplying ink to the first tank. A liquid level sensor is mounted in the first tank. The ink supply system also comprises an overflow sensor.

U.S. Pat. No. 4,788,861 discloses an apparatus for monitoring the ink supply of an ink printing device. The apparatus comprises three electrodes for measuring resistance. A first electrode pair is constantly moistened by the ink to provide an ink comparison resistance. An additional electrode with one of the first pair serves for measuring the resistance change due to fluid level. This arrangement can determine a high and low ink level.

U.S. Pat. No. 4,432,005 discloses an ink control system for an ink jet color printer. The printer comprises three long tubular supply sacks connected to three secondary ink reservoirs mounted on a printhead through flexible umbilical tubes.

U.S. Pat. No. 4,929,969 discloses an ink supply construction for an ink jet printer which uses a foam-filled ink reservoir. The foam structure comprises a network of fine filaments to reduce drooling of the ink and provide a slight negative pressure to the ink at the printhead. While it is known to provide a small foam-filled replenishable ink reservoir attached to a carriage-mounted printhead for movement therewith, such disclosures and prior art printers do not have a reliable, cost effective way to ensure that the printhead replenishable reservoir maintains a sufficient supply of ink by monitoring the ink content in the replenishable reservoir and refilling it at predetermined levels, while concurrently ensuring that the replenishable reservoir is not overfilled.

SUMMARY OF THE INVENTION

It is the object of the present invention to provide a small foam-filled replenishable ink reservoir attached to the carriage-mounted printhead for movement therewith having an ink supply monitoring means for sensing the ink content therein. At predetermined ink depletion levels, the replenishable reservoir is moved to and connected with a larger, stationary ink supply reservoir and refilled thereby. The ink supply monitoring means ensuring that the replenishable ink reservoir is not overfilled.

It is another object of the invention to provide an ink supply monitoring means for a small replenishable ink reservoir comprising a thermistor and circuitry therefor which measures the ink content by the temperature rise of the thermistor.

In the present invention, a carriage type ink jet printer having ink supply monitoring means comprising a replenishable reservoir and at least one printhead having a manifold with an inlet and a plurality of nozzles, the printhead being adapted to eject and propel ink droplets on demand from the nozzles to a recording medium to record information thereon. The replenishable reservoir supplies ink to the printhead manifold through its inlet at a predetermined pressure, the reservoir being combined with the printhead to form a printhead assembly. The printhead assembly is replaceably mounted on a translatable carriage for translation thereby along a path back and forth across a printing region of the printer containing the recording medium. A fixed ink supply container is positioned on one side of the printing region and adjacent one end of the carriage path. A means to replenish the reservoir periodically from the supply container is provided when the reservoir is adjacent the supply container. A thermistor for sensing the ink content of the ink reservoir is used by periodically energizing it to heat it for a fixed interval of time and measuring the temperature rise, comparing it to preestablished values to determine the ink depletion state of the reservoir. Circuitry means activate said means to replenish the reservoir in response to the state of ink depletion determined by the temperature rise comparison with the preestablished values, whereupon repeated attempts to replenish the reservoir without success will be interpreted to indicate an empty supply container and an out-of-ink signal will be generated. Continued temperature rise measurements during refill will provide an indication when the reservoir is full, so that overfilling is prevented.

The foregoing features and other objects will be apparent from a reading of the following specification in conjunction with the drawings, wherein like parts have the same index numerals.

DESCRIPTION OF THE PREFERRED EMBODIMENT

Figure 1:
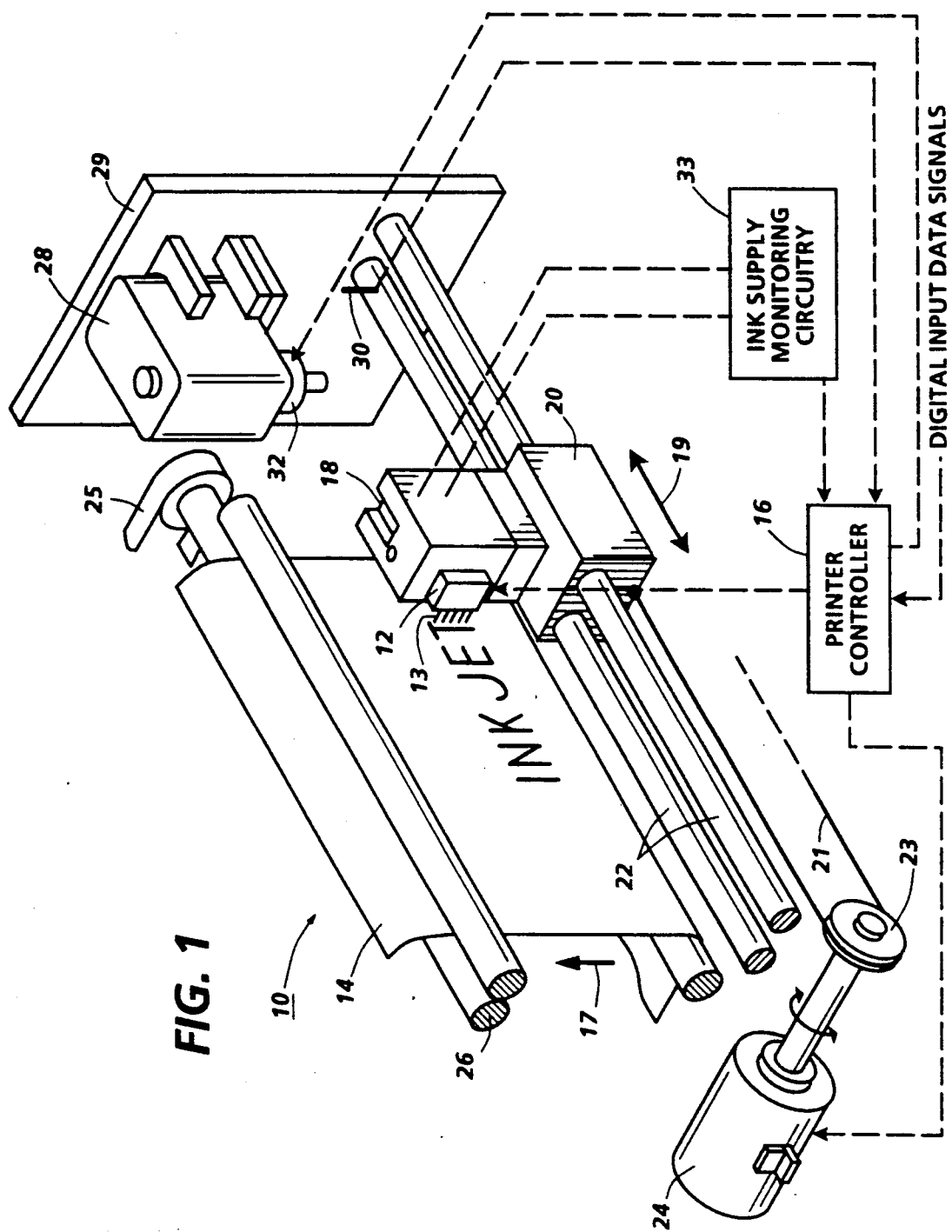
FIG. 1 is a schematic partial isometric view of a carriage type ink jet printer having the ink supply monitoring means of the present invention.

In FIG. 1, a partial isometric view of a carriage type thermal ink jet printer 10 is shown, having a translatable carriage 20 which reciprocally moves a printhead 12 and attached ink supplying reservoir 18 back and forth across a recording medium 14, such as paper. The printhead 12 is of the type disclosed in U.S. Pat. No. 4,774,530 to Hawkins and contains a linear array of capillary-filled ink channels, a manifold with an inlet in communication with one end of the channels, and a plurality of nozzles are provided at the opposite ends of the channels. The channels thus provide communication between the manifold and the nozzles and contain heating elements in each channel a predetermined distance upstream from the nozzles. The printhead ejects and propel ink droplets 13 on demand from the nozzles to a recording medium 14 to record information thereon in response to the application of electrical pulses to the heating elements by the printer controller 16. For a more detailed description of the printhead, refer to U.S. Pat. No. 4,774,530 mentioned above which is incorporated herein by reference. The printhead is sealingly attached to the reservoir 18, more fully described later, and it has an opening 27 (see FIG. 2) therein for providing ink (not shown) to the printhead through the manifold inlet. The reservoir is replenishable and is mounted on carriage 20 which is translated back and forth across the recording medium along guide rails 22 as indicated by arrow 19 by a cable 21 and pulley system 23. The cable and pulley system is driven by reversible motor 24 under the control of the printer controller 16. The printhead nozzles are aligned perpendicular to the carriage reciprocating direction 19 and parallel to the stepping direction of the recording medium 14, indicated by arrow 17. Thus, a printhead prints a swath of information on the stationary recording medium as it moves in one direction and the recording medium is held stationary. Prior to the carriage and printhead reversing direction, the recording medium is stepped in direction 17 by the roller pair 26 when driven via motor (not shown) and timing belt 25. The nip of the roller pair 26 steps the recording medium a distance equal to the printed swath in the direction of arrow 17 and then the printhead moves in an opposite direction, printing another swath of information. Ink droplets 13 are expelled and propelled to the recording medium from the nozzles in the printhead in response to digital input data signals received by the printer controller which in turn selectively addresses the individual heating elements (not shown) of the printhead with a current pulse. The energized heating element vaporizes the ink in contact therewith to produce temporary vapor bubbles that expel the ink droplets, as is well known in the art. A fixed supply container 28 of ink is mounted on a printer frame member 29 and in alignment with the guide rails attached thereto, so that when the ink supply monitoring circuit 33 determines that the replenishable reservoir 18 needs more ink, the carriage is moved beyond the printing region comprising the recording medium and underneath the fixed supply container. A limit switch 30, or the like, signals the printer controller that the replenishable reservoir is in the appropriate position underneath the fixed supply container and the printer controller stops the carriage and opens valve 32, enabling ink 31 (see FIG. 2) to flow into the replenishable reservoir.

Figure 2:
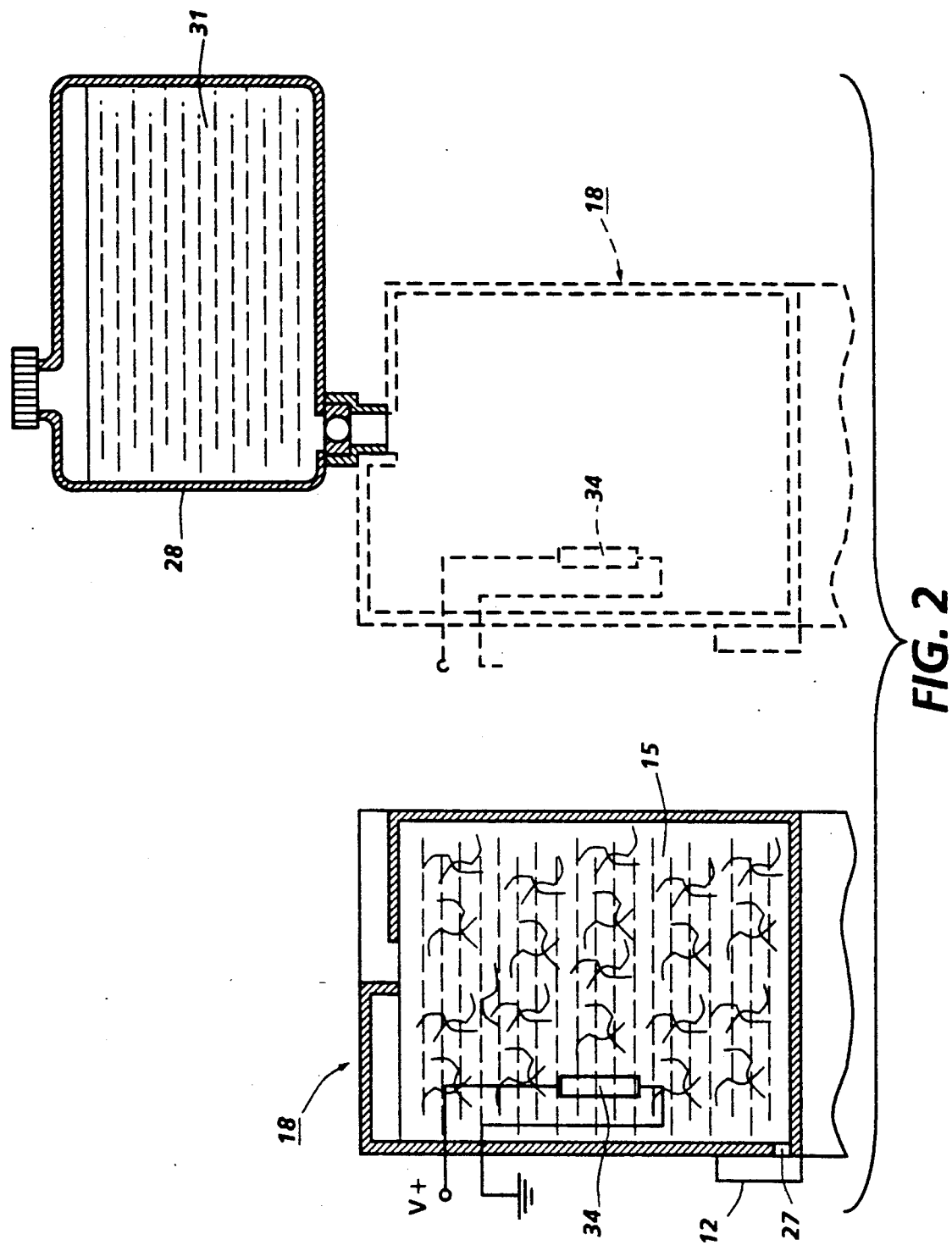
FIG. 2 is an enlarged schematic cross-sectional view of the replenishable ink reservoir and fixed ink supply container of FIG. 1.

Referring to FIG. 2, the replenishable reservoir 18 contains a foam 15 or other similar material which will provide the necessary negative pressure at the printhead and a thermistor 34 in the foam or other material at a location at about the center of the replenishable reservoir. The thermistor is a temperature sensitive resistor whose resistance changes with temperature. In this application, the thermistor is used as both heater element and temperature sensor. Electrical power applied to the thermistor causes its temperature to rise above that of its surrounding foam or other material. The thermal properties of the surrounding materials are affected by the ink content in those materials; when saturated with ink, the thermal conductivity and heat capacity (of the surrounding materials) will be greater than when there is little or no ink remaining. The temperature of the thermistor will begin to increase when external power is applied. The magnitude of the increase in temperature will be dependent on the power applied, the thermal conductivity and heat capacity of the thermistor itself and its surrounding material, and time. By controlling all of these factors except the thermal properties of the surrounding materials, the temperature rise of the thermistor can be used as a measure of those properties, and, to the extent that those properties vary with ink content, the ink content in the surrounding materials.

It is desired, then, to apply some external electrical power to the thermistor for a fixed length of time and to measure the change in temperature of the thermistor due to that energy input. Since the resistance of the thermistor is dependent on its temperature, that resistance is used to indicate the temperature. To make the measurement insensitive to ambient temperature fluctuations, it is desirable to measure the change in temperature of the thermistor (via its change in resistance) during the time the external power is applied.

In order to determine the resistance of a resistor (or thermistor), it is necessary to pass a current through the device and measure the voltage drop across it. The resistance is determined by dividing the voltage drop across the resistor by the current through it. In practice, it is easier to measure voltage than to measure current, and by driving the thermistor with a (known) constant current, the resistance may be calculated from the measured voltage drop across the resistor.

Figure 3:
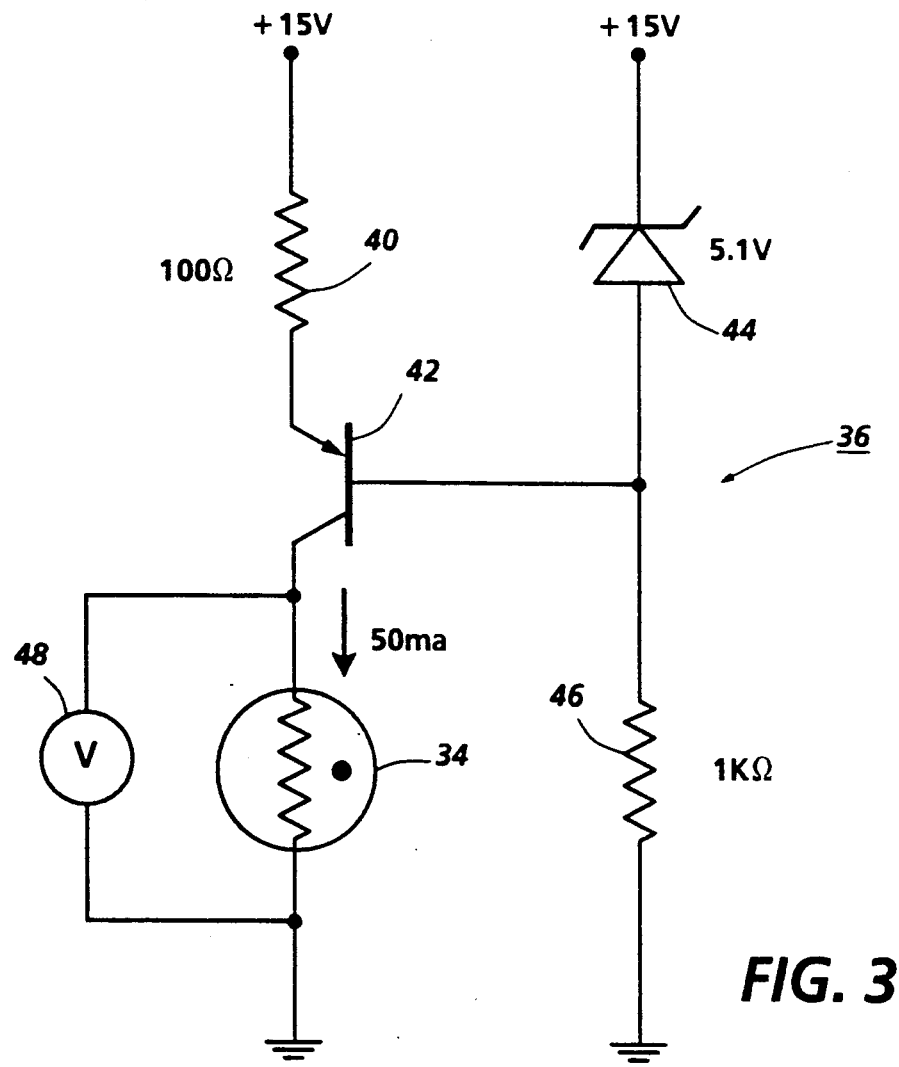
FIG. 3 is the circuit diagram for the ink supply monitoring means.

FIG. 3 is a circuit diagram 36 showing a simple constant current source driving the sensing thermistor 34 with voltage measuring means 48 measuring the voltage drop across the thermistor. In FIG. 3, transistor 42 has its base biased to a voltage 5.1 volts below the power supply value by Zener diode 44. Resistor 46 allows the required bias current for Zener diode 44 to flow to ground. PNP transistor 42 regulates current flow from its collector to ground by balancing the voltage at its base with that at the emitter. Thus, current flow from the 15 volt power supply through the 100 ohm resistor 40 and into the emitter of transistor 42 results in a voltage drop which balances that of the Zener diode. Most of the current which enters the emitter of transistor 42 passes through to the collector and it through the thermistor 34 to ground.

With the circuit values as shown in FIG. 3, the current through thermistor 34 is approximately 50 ma, and is relatively constant in spite of significant changes in the resistance of said thermistor whose room temperature resistance is 100 ohms. The ink supply monitoring circuitry 33 in FIG. 1 includes the constant current generation circuit 36 in FIG. 3, which is used in the preferred embodiment.

Figure 4:
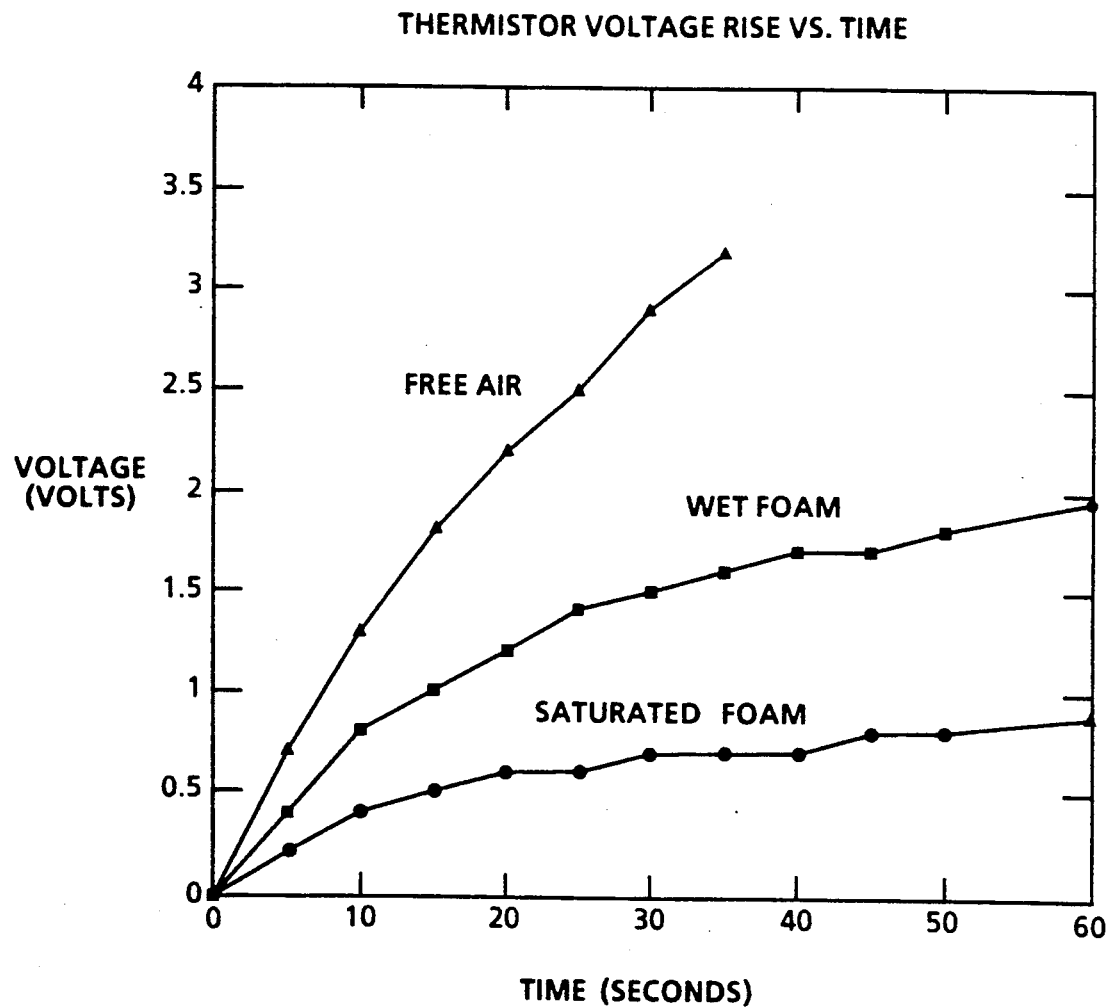
FIG. 4 is a plot of the thermistor voltage rise versus time from which the ink depletion status of the replenishable reservoir is established.

FIG. 4 shows the output of a circuit like that in FIG. 3 versus time when the thermistor 34 is embedded in foam 15 of FIG. 2 which is saturated with ink, when it is wet (but not saturated) with ink, and when there is no ink present. When power is first applied to the circuit above, the thermistor is at room temperature, and its resistance is about 100 ohms so that with 50 ma through it, the voltage drop across the thermistor is about 5.0 volts. With the passage of time as the power to the circuit is maintained, the temperature of the thermistor 34 and its resistance increase. An increase in thermistor resistance causes an increase in the voltage drop across the device. The ordinate values in the curves shown in FIG. 4 were obtained by subtracting the initial voltage reading when the power to the circuit was first applied (5.0 volts) from the reading obtained at each time.

The uppermost curve in FIG. 4 shows the thermistor voltage rise versus time for the case where the foam surrounding thermistor 34 is completely depleted of ink. The lower curve shows the response when the foam is saturated with ink, and the center curve shows the response of the case of a wet (about ½ saturated with ink) foam. From FIG. 4, those skilled in the art will recognize that if the thermistor is powered for a 10 second period of time and the change in thermistor voltage is greater than about 0.75 volts, more ink should be added to the replenishable reservoir. If, on the other hand, the power is applied for a period of 20 seconds, ink would only be added if the change in thermistor voltage (from beginning to end of the heating period) exceeded 1.2–1.3 volts.

Referring once again to FIG. 3, a voltage sensor 48 senses the voltage across thermistor 34 and sends signals representative of that voltage to printer controller 16 of FIG. 1. The controller compares that voltage to values stored in a look-up table to determine the ink content in the replenishable reservoir. In the preferred embodiment, the cartridge is refilled when it is about half empty.

When it is determined that the replenishable cartridge needs to be resupplied with ink, as shown in FIGS. 1 and 2, the controller then moves the carriage to one side of the printing region and, as illustrated, to the right until the carriage contacts limit switch 30, indicating that the replenishable cartridge is aligned with the fixed supply ink container outlet, whereat valve 32 is actuated and ink allowed to enter the replenishable cartridge. During the refill, the thermistor is pulsed with constant current pulses and when the voltage across the thermistor is only ½ a volt after 20 seconds, the cartridge is full, the valve 32 closed and the cartridge returned to the printing region in the printer, eliminating the possibility of overfilling the cartridge. In FIG. 2, a cross-sectional view of the replenishable cartridge 18 and the fixed ink supply container 28 are shown with the replenishable cartridge and printhead shown at one end of the printing region in solid line, and the replenishable ink cartridge shown in dotted line when it is positioned to receive ink from the fixed ink supply container.

Many modifications and variations are apparent from the foregoing description of the invention and all such modifications and variations are intended to be within the scope of the present invention.

I claim:

1. A method of monitoring the ink content in a replenishable reservoir attached to a printhead and mounted for translation in a carriage type ink jet printer, comprising the steps of:
   (a) placing a thermistor in the reservoir;
   (b) periodically energizing the thermistor with a constant current pulse for fixed periods of time;
   (c) measuring the voltage across the thermistor during its energization since the thermistor resistance changes with temperature;
   (d) comparing the voltage to predetermined values in a look up table to determine the ink content in the reservoir;
   (e) moving the reservoir to a location adjacent a fixed ink supply container with a valve adapted to open when said reservoir is located adjacent said supply container when ink content is at a predetermined depletion state; and
   (f) repeating steps (b) to (d) while the reservoir is adjacent the supply container and being replenished with ink therefrom to prevent overfilling.

2. A carriage type ink jet printer having a printer controller for generating control signals and an ink supply monitoring means comprising:
   a printhead having a plurality of nozzles and a manifold with an inlet, the nozzles being in communication with the manifold, and the printhead being adapted to eject and propel ink droplets on demand from the nozzles to a record medium to record information thereon;
   a replenishable reservoir containing ink for supplying ink to the printhead manifold inlet at a predetermined pressure, the reservoir being attached to the printhead to form a printhead assembly;
   a translatable carriage upon which the printhead assembly is replaceably mounted for translation thereby along a path of predetermined length back and forth across a printing region of the printer containing the recording medium;
   means for translating the carriage in response to control signals received from the controller;

a fixed ink supply container positioned on one side of the printing region and adjacent one end of the carriage path;

a thermistor means being located within the reservoir for sensing the ink content of the reservoir;

an ink monitoring circuit having a constant current source from which the thermistor means is periodically energized with a constant current for a fixed interval of time thereby causing a temperature rise by said thermistor means;

the ink supply monitoring circuit measuring the temperature rise of the thermistor means, comparing the measured temperature rise with predetermined values indicative of ink content in the reservoir to determine the ink depletion state of the reservoir, and sending signals indicative of the ink depletion state to the controller; and in response to a predetermined state of ink depletion, said controller sending control signals to the translation means to translate the carriage from the printing region to a replenishment position adjacent the supply container for replenishment thereby, and while said reservoir is being replenished with ink from said fixed supply container, the ink supply monitoring circuit periodically energizing the thermistor means, measuring temperature rises by said thermistor means, comparing the temperature rises with said predetermined values, and sending signals indicative of the ink content to the controller, so that the replenishment may be stopped as soon as the reservoir is filled to prevent overfilling thereof.

3. The printer in claim 2, wherein repeated attempts to replenish the reservoir without success will be interpreted to indicate an empty supply container and an out-of-ink signal will be generated.

4. The printer of claim 2, wherein the replenishable reservoir contains a porous foam material having suitable capillarity to provide a sufficient negative pressure to the ink contained therein; and wherein the thermistor means comprises a thermistor located within the foam material in the reservoir and a constant current circuit.

5. The printer of claim 4, wherein the constant current circuit comprises a power supply, a voltage measuring means for measuring the voltage drop across the thermistor, a transistor having its base biased to a predetermined voltage by a Zener diode, the current flow from the power supply to the transistor emitter resulting in a voltage drop which balances that of the Zener diode and passes through the thermistor to ground, so that a constant current flows through the thermistor even when the resistance of the thermistor changes, enabling the change in voltage drop across the thermistor measured by the voltage measuring means to be representative of the ink content in the replenishable reservoir.

* * * * *